(12) United States Patent
Omori et al.

(10) Patent No.: US 11,522,579 B2
(45) Date of Patent: Dec. 6, 2022

(54) ATTACHABLE BOOSTER ANTENNA AND READER/WRITER USING SAME

(71) Applicant: Murata Manufacturing Co., Ltd., Nagaokakyo (JP)

(72) Inventors: Ryohei Omori, Nagaokakyo (JP); Noboru Kato, Nagaokakyo (JP)

(73) Assignee: MURATA MANUFACTURING CO., LTD., Nagaokakyo (JP)

(\*) Notice: Subject to any disclaimer, the term of this patent is extended or adjusted under 35 U.S.C. 154(b) by 30 days.

(21) Appl. No.: 16/229,218

(22) Filed: Dec. 21, 2018

(65) Prior Publication Data

US 2019/0115954 A1 Apr. 18, 2019

Related U.S. Application Data

(63) Continuation of application No. PCT/JP2017/019532, filed on May 25, 2017.

(30) Foreign Application Priority Data

Jun. 30, 2016 (JP) .............................. JP2016-130506

(51) Int. Cl.
*H04B 5/00* (2006.01)
*H01Q 7/00* (2006.01)
(Continued)

(52) U.S. Cl.
CPC ..... *H04B 5/0062* (2013.01); *G06K 19/07794* (2013.01); *H01Q 1/2208* (2013.01);
(Continued)

(58) Field of Classification Search
CPC .................................................. H04B 5/0062
(Continued)

(56) References Cited

U.S. PATENT DOCUMENTS

2005/0057422 A1 3/2005 Deguchi
2006/0208899 A1 9/2006 Suzuki et al.
(Continued)

FOREIGN PATENT DOCUMENTS

JP   H08116304 A   5/1996
JP   2004199226 A  7/2004
(Continued)

OTHER PUBLICATIONS

International Search Report issued for PCT/JP2017/019532, dated Aug. 15, 2017.
(Continued)

*Primary Examiner* — Rafferty D Kelly
(74) *Attorney, Agent, or Firm* — ArentFox Schiff LLP

(57) ABSTRACT

An attachable booster antenna attachable to a coil antenna, includes a body; and an antenna including a multiple resonant antennas arrayed on the body, with each resonant antenna including an insulator layer having first and second surfaces; and first and second loop antennas disposed on the first and second surfaces, respectively, so as to confront each other via the insulator layer. Moreover, the first and second loop antennas each having an opening that discontinue a part of a loop and are arranged such that a closed loop is defined by at least a part of the first loop antenna and at least a part of the second loop antenna in a transparent plane viewed from a normal direction of the insulator layer. Furthermore, in the plan view of the insulator layer, the opening of the first and second loop antennas and the opening of the coil antenna overlap each other.

23 Claims, 13 Drawing Sheets

(51) Int. Cl.
*H04B 5/02* (2006.01)
*H01Q 19/06* (2006.01)
*H01Q 1/22* (2006.01)
*H01Q 21/06* (2006.01)
*H01Q 15/00* (2006.01)
*G06K 19/077* (2006.01)
*H01Q 1/38* (2006.01)
*H01Q 1/36* (2006.01)

(52) U.S. Cl.
CPC ............ *H01Q 1/2216* (2013.01); *H01Q 1/38* (2013.01); *H01Q 7/00* (2013.01); *H01Q 15/0013* (2013.01); *H01Q 19/06* (2013.01); *H01Q 21/061* (2013.01); *H04B 5/0081* (2013.01); *H04B 5/02* (2013.01); *H01Q 1/36* (2013.01)

(58) Field of Classification Search
USPC ........................................................ 235/492
See application file for complete search history.

(56) References Cited

U.S. PATENT DOCUMENTS

| | | | | |
|---|---|---|---|---|
| 2007/0139285 A1* | 6/2007 | Maruyama | ............... | H01Q 7/00 343/741 |
| 2008/0191959 A1* | 8/2008 | Koyama | ............. | H01Q 1/2283 343/873 |
| 2012/0206239 A1 | 8/2012 | Ikemoto | | |
| 2013/0112754 A1 | 5/2013 | Ikemoto | | |
| 2013/0154803 A1 | 6/2013 | Koch | | |
| 2017/0017871 A1* | 1/2017 | Finn | ........................ | B23K 26/40 |

FOREIGN PATENT DOCUMENTS

| | | | |
|---|---|---|---|
| JP | 2005102101 | A | 4/2005 |
| JP | 2005277983 | A | 10/2005 |
| JP | 2005339507 | A | 12/2005 |
| JP | 2006025363 | A | 1/2006 |
| JP | 2006093977 | A | 4/2006 |
| JP | 2006246372 | A | 9/2006 |
| JP | 2008242768 | A | 10/2008 |
| JP | 2008294863 | A | 12/2008 |
| JP | 2008301241 | A | 12/2008 |
| JP | 2008306689 | A | 12/2008 |
| JP | 2011029814 | A | 2/2011 |
| JP | 2013141164 | A | 7/2013 |
| JP | 5370581 | B2 | 12/2013 |
| JP | 2015177196 | A | 10/2015 |
| WO | 2012036139 | A1 | 3/2012 |
| WO | 2013042604 | A1 | 3/2013 |

OTHER PUBLICATIONS

Written Opinion of the International Search Authority issued for PCT/JP2017/019532, dated Aug. 15, 2017.

* cited by examiner

ATTACHABLE BOOSTER ANTENNA AND READER/WRITER USING SAME

CROSS-REFERENCE TO RELATED APPLICATIONS

This application is a continuation of International Patent Application No. PCT/JP2017/019532 filed on May 25, 2017, which claims priority to Japanese Patent Application No. 2016-130506 filed on Jun. 30, 2016, the entire contents of which are incorporated herein by reference.

TECHNICAL FIELD

The present invention relates to an attachable booster antenna and a reader/writer using the same.

BACKGROUND

The management of goods and articles using an RFID tag has been utilized in various fields. In some cases, the goods management is carried out by embedding the RFID tag into an article. For example, there is a case to embed the RFID tag into a shoo sole, to perform the goods management, as shown in Japanese Patent No. 5370581B (i.e., referred to as Patent Document 1).

However, the insert position of the RFID tag into an article cannot often be defined and is not necessarily the same for each individual article. In many cases, the resin for an object of insertion is opaque and the RFID tag inserted into an article cannot be visually confirmed from the outside of the article. The insert position of the RFID tag into the article is not a certain point, which sometimes makes it difficult for alignment to a position at which the RFID tag is readable.

For that reason, in the case of reading without alignment of the RFID tag, there is a need to attach a plurality of reader/writers, resulting in an increased cost.

In the case of an RFID tag incorporating a small-sized loop antenna in particular, if a loop antenna of the reader/writer is too large as compared with the RFID tag, a hard-to-detect null point occurs near the center of the reader/writer loop antenna. Hence, the reader/writer loop antenna is also required to reduce its size (see, e.g. Patent Document 1) for the RFID tag incorporating the small-sized loop antenna.

SUMMARY OF THE INVENTION

Thus, according to an exemplary embodiment of the present disclosure, and an attachable booster antenna and a reader/writer using the same is provided that is configured for reading the small-sized loop antenna of the RFID tag without provision of a plurality of reader/writers.

In one exemplary aspect, an attachable booster antenna is provided that is attachable to a coil antenna, and that includes a body; an antenna including a plurality of resonant antennas disposed on the body portion; and an attachment portion for attaching the coil antenna to the body portion, with the attachment portion being disposed at a position for the coil antenna to magnetically couple with one resonant antenna among the plurality of resonant antennas.

In another exemplary aspect, a reader/writer is disclosed that includes a coil antenna; and an attachable booster antenna attached to the coil antenna, with the attachable booster antenna comprising a body; an antenna including a plurality of resonant antennas arrayed on the body portion; and an attachment portion for attaching the coil antenna to the body portion. Moreover, the attachment portion is disposed at a position for the coil antenna to magnetically couple with one resonant antenna among the plurality of resonant antennas.

According to the attachable booster antenna and the reader/writer using the same of the present disclosure, the RFID tag incorporating the small-sized loop antenna can be read without providing a plurality of reader/writers.

DETAILED DESCRIPTION

Figure 1:
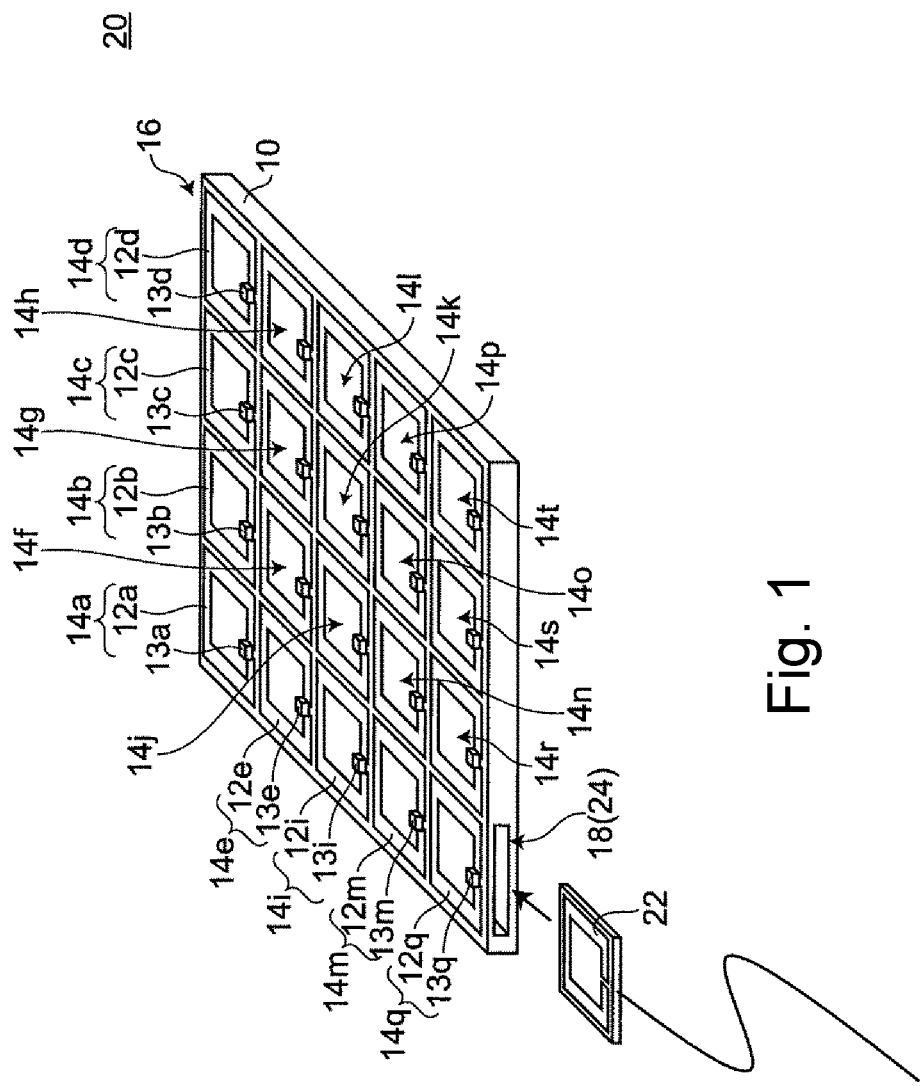
FIG. 1 is a perspective view showing a configuration of an attachable booster antenna according to a first exemplary embodiment.

An attachable booster antenna attachable to a coil antenna according to a first exemplary aspect is disclosed that includes a body; an antenna including a plurality of resonant antennas arrayed on the body portion; and an attachment portion for attaching the coil antenna to the body portion. In this aspect, the attachment portion is disposed at a position for the coil antenna to magnetically couple with one resonant antenna among the plurality of resonant antennas.

Further, the attachable booster antenna of an exemplary aspect, the antenna portion sets a resonant frequency of the resonant antenna at a center of the array higher than the resonant frequency of the resonant antenna at ends of the array.

Further, the attachable booster antenna of another exemplary aspect, the resonant antenna includes an insulator layer having a first surface and a second surface; and a first and a second loop antennas arranged on the first surface and the second surface, respectively, so as to confront each other via the insulator layer, the first and the second loop antennas each having an opening that discontinues a part of a loop, the first and the second loop being arranged such that a closed loop is defined by at least a part of the first loop antenna and at least a part of the second loop antenna in a transparent plane viewed from a normal direction of the insulator layer.

Further, the attachable booster antenna of another exemplary aspect, the plurality of resonant antennas each includes a loop antenna and a capacitance connected in series to the loop antenna.

Further, the attachable booster antenna of another exemplary, in the antenna portion, the plurality of resonant antennas are two-dimensionally arrayed on the body portion in a plane.

Further, the attachable booster antenna of another exemplary, the plurality of resonant antennas each including a loop antenna having inner and outer diameter dimensions substantially equal to those of the coil antenna are arranged on the body portion at regular intervals along a first direction.

Further, the attachable booster antenna of another exemplary, the antenna portion includes a first row in which the plurality of resonant antennas are arrayed along the first direction; and a second row in which the plurality of resonant antennas are arrayed along the first direction, adjacent to the first row in a second direction orthogonal to the first direction, the second row being arrayed offset from the first row.

Further, the attachable booster antenna of another exemplary, the attachment portion comprises a slot into which the coil antenna is inserted.

Further, the attachable booster antenna of another exemplary, in the attachment portion, the coil antenna and one resonant antenna of the plurality of resonant antennas are screwed together.

Further, the attachable booster antenna of another exemplary, in the attachment portion, the coil antenna is rotatably attached.

Further, the attachable booster antenna of another exemplary, the body portion is of a curved surface shape.

Further, the attachable booster antenna of another exemplary, the body portion is of a card type.

In another exemplary embodiment, a reader/writer is disclosed that includes a coil antenna; and an attachable booster antenna attached to the coil antenna, with the attachable booster antenna comprising a body; an antenna including a plurality of resonant antennas arrayed on the body portion; and an attachment portion for attaching the coil antenna to the body portion. In this aspect, the attachment portion being disposed at a position for the coil antenna to magnetically couple with one resonant antenna among the plurality of resonant antennas.

An attachable booster antenna and a reader/writer according to the exemplary embodiments will now be described with reference to the accompanying drawings. In the drawings, substantially the same members are designated by the same reference numerals.

First Embodiment

Figure 2:
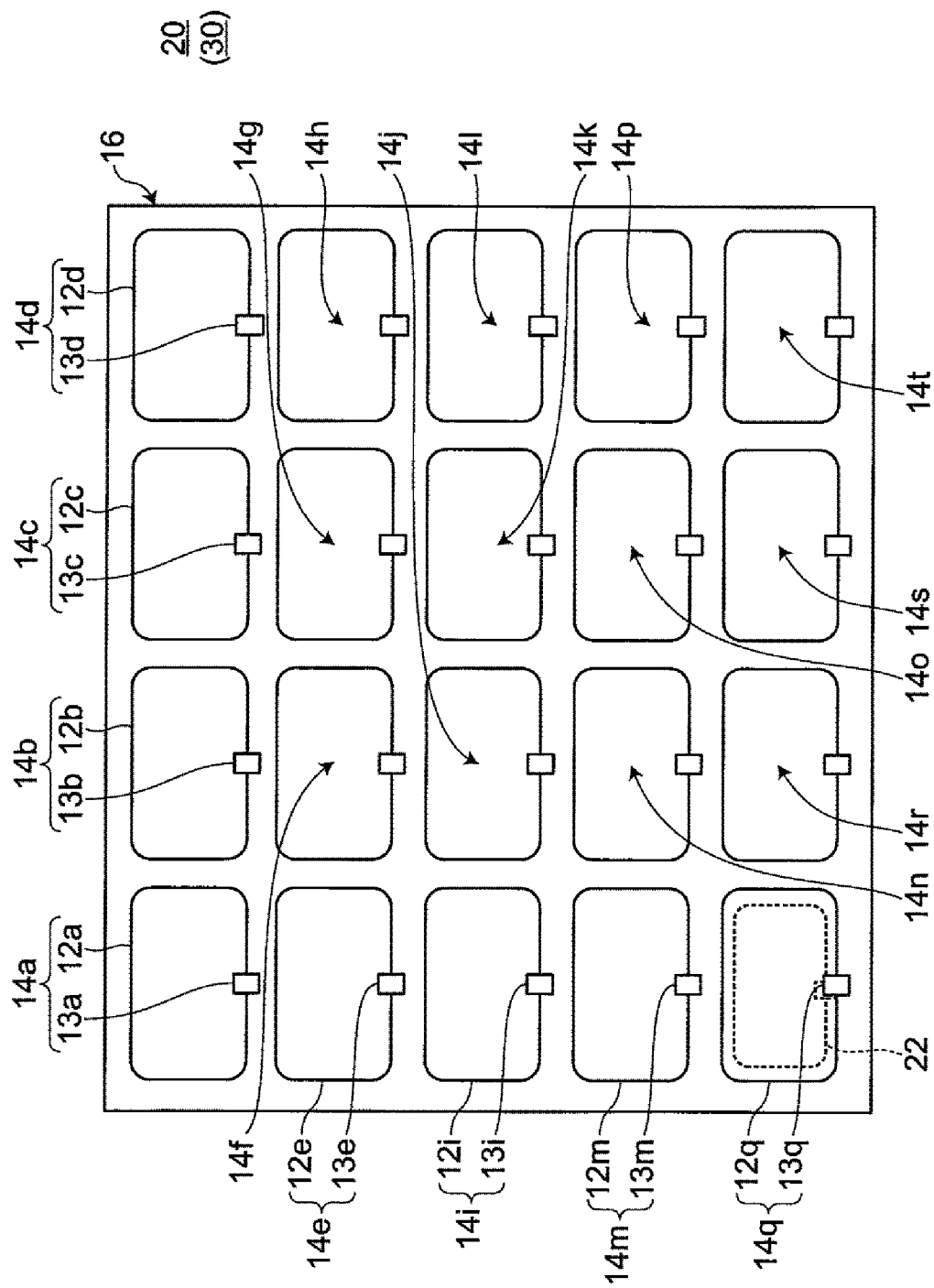
FIG. 2 is a plan view of the attachable booster antenna f FIG. 1.

FIG. 1 is a perspective view showing a configuration of an attachable booster antenna 20 according to a first exemplary embodiment. FIG. 2 is a plan view of the attachable booster antenna 20 of FIG. 1.

The attachable booster antenna 20 according to the first embodiment is an attachable booster antenna attachable to a coil antenna 22. This attachable booster antenna 20 comprises a body portion 10 (i.e., a "body"), an antenna portion 16 (i.e., an "antenna") including a plurality of resonant antennas 14a to 14t arrayed on the body portion 10, and an attachment portion 18 (also referred to as an "attachment member") for attachment of the coil antenna 22 to the body portion 10. This attachment portion 18 is disposed at a position for the coil antenna 22 to magnetically couple with the resonant antenna 14q that is one of the plurality of resonant antennas 14a to 14t. According to the exemplary aspect, the coil antenna 22 is configured to read an RFID tag by itself if a proper alignment is possible.

The exemplary attachable booster antenna 20 comprises a slot 24 that is the attachment portion 18 for attaching the coil antenna 22 to the body portion 10. The slot 24 is disposed at a lower part of the resonant antenna 14q so that the coil antenna 22 and the resonant antenna 14q can magnetically couple together by inserting the coil antenna 22 into the slot 24. A reader/writer 30 is thus configured that is a combination of the coil antenna 22 and the attachable booster antenna 20 (FIG. 2).

Figure 10:
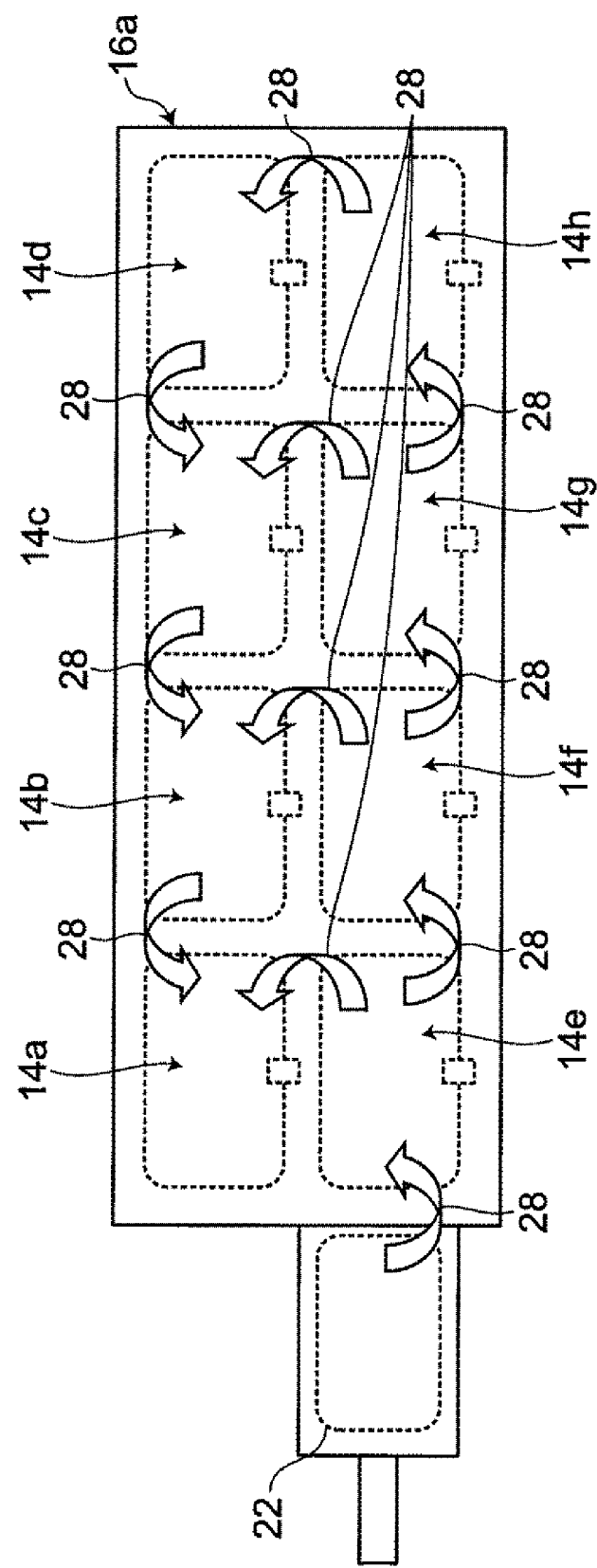
FIG. 10 is a schematic view showing a state of the resonant antennas of the attachable booster antenna of FIG. 9, magnetically coupled together.

On the other hand, in the antenna portion 16, the plurality of resonant antennas 14a to 14t are two-dimensionally arrayed in a plane such that the resonant antennas 14a to 14t lie at positions for the adjacent resonant antennas to be magnetically coupled with each other. That is, when the coil antenna 22 and the resonant antenna 14q are magnetically coupled together, the entire resonant antennas 14a to 14t magnetically couple with the coil antenna 22, as will be described later (FIG. 10). As a result, by use of the attachable booster antenna 20, the detectable range in the case of the coil antenna 22 can be expanded up to the entire antenna portion 16.

According to the exemplary attachable booster antenna 20, since it is configured to be attached (i.e., "attachable") to the coil antenna 22, the hitherto-used coil antenna 22 is available intact. It is easy to handle as a handy-type booster antenna. In the case where it is desired to change the size of the booster antenna in response to a type change of the RFID tag, the change can easily be performed by replacing it with a completely different booster antenna.

Hereinafter, structural members making up this attachable booster antenna 20 will be described.

<Body Portion>

The body portion 10 (i.e., the "body") is a base for disposing the antenna portion 16 and the attachment portion thereon. The body portion 10 may be configured from only a base film such as PET film or polyimide film for example or may have a two or more layered structure that includes a substrate having a rigidity and a base film for forming the antenna portion. This body portion is of a card type and is graspable. The body portion is not limited to the card type and may be in the shape of a curved surface or a semi-sphere for example.

<Antenna Portion>

Figure 12:
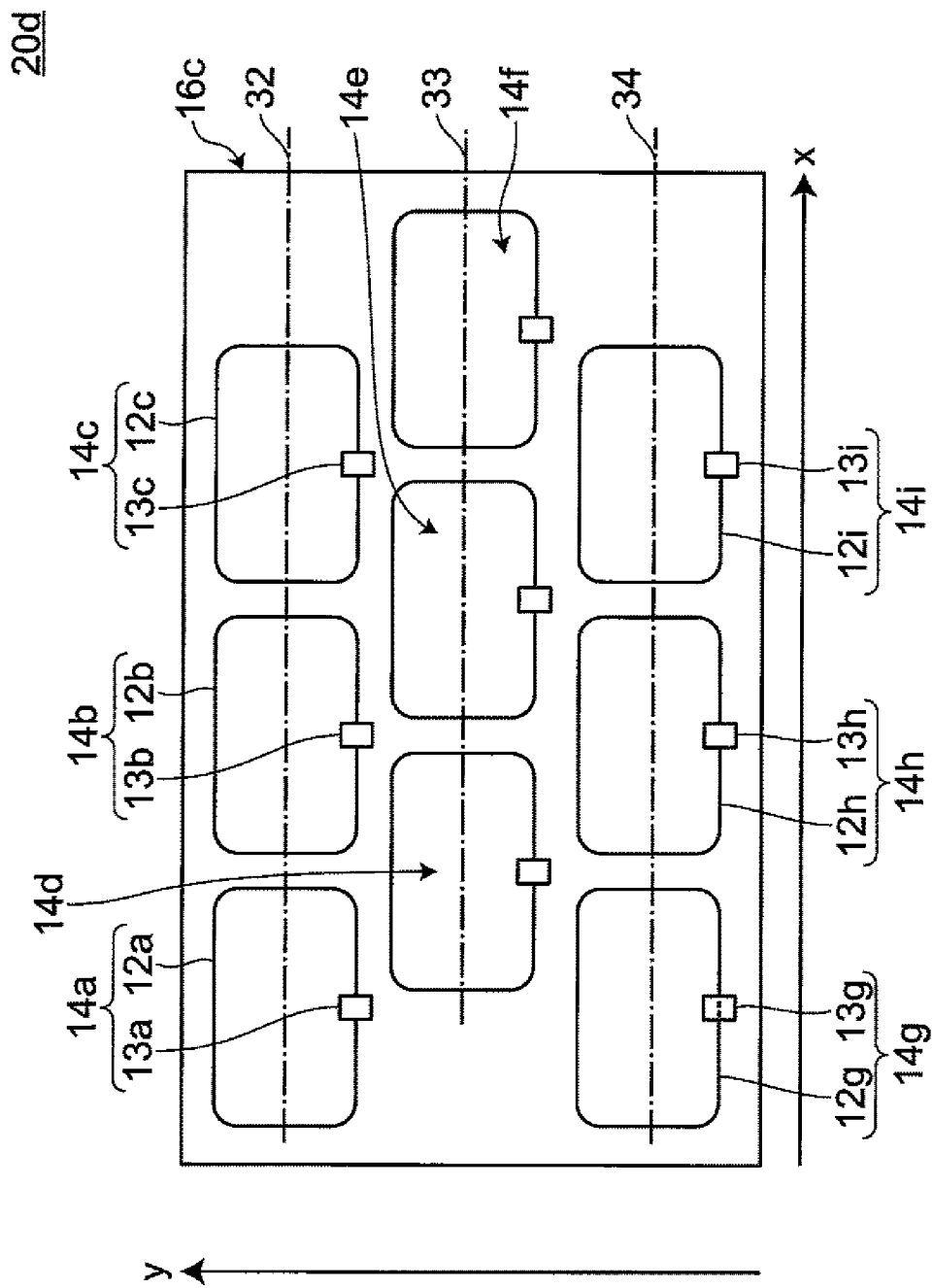
FIG. 12 is a plan view of an attachable booster antenna according to a fifth exemplary embodiment.
Figure 13:
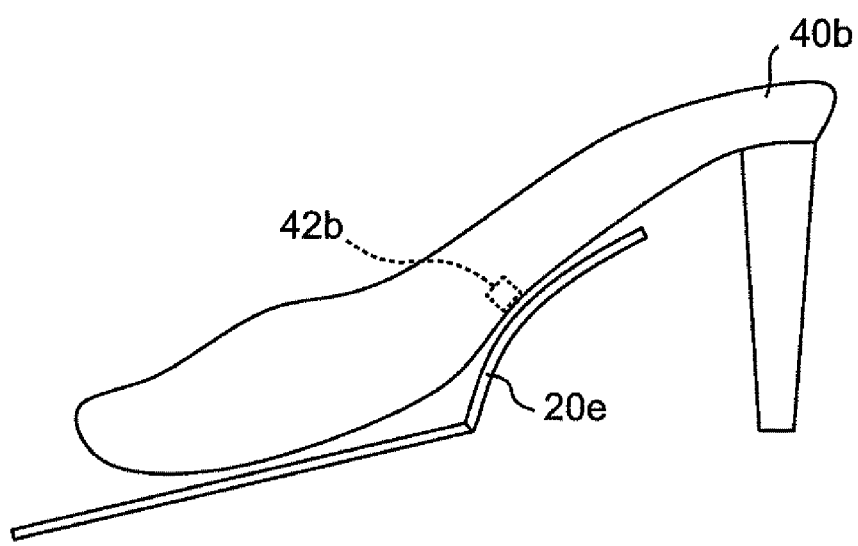
FIG. 13 is a schematic view showing a state of an attachable booster antenna according to a sixth exemplary embodiment, abutted against an RFID tag disposed on a sole of a high-heeled shoe.

The antenna portion 16 (i.e., the "antenna") is disposed on the body portion 10 and includes the plurality of resonant antennas 14a to 14t that are two-dimensionally arrayed in a plane. Specifically, they are arranged in the form of a matrix in the plane. The resonant antennas 14a to 14t are located at positions for the adjacent resonant antennas to be magnetically coupled with each other. It is noted that the arrangement pattern of the resonant antennas 14a to 14t is not limited to the two-dimensional array in the plane of FIG. 2. For example, as shown in FIG. 12 described later, of a first row and a second row of the resonant antennas that are arranged at regular intervals along an x-axis in the plane, the second row may be arranged offset in the x-axis direction. The array is not limited to the two-dimensional array in the plane and may be a one-dimensional array in the plane. Furthermore, as shown in FIG. 13, the arrangement on a curved surface is also possible. It is to be noted that the two-dimensional array is also possible if arranged in a curved surface.

<Resonant Antenna>

Figure 3A:
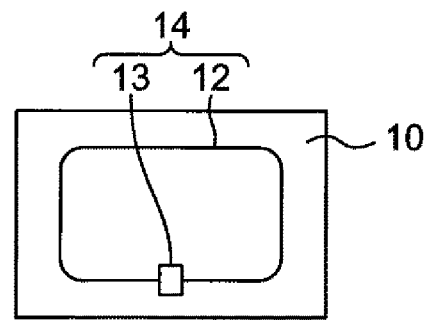
FIG. 3A is a plan view of one resonant antenna configuring an antenna portion of the attachable booster antenna of FIG. 1.
Figure 3B:
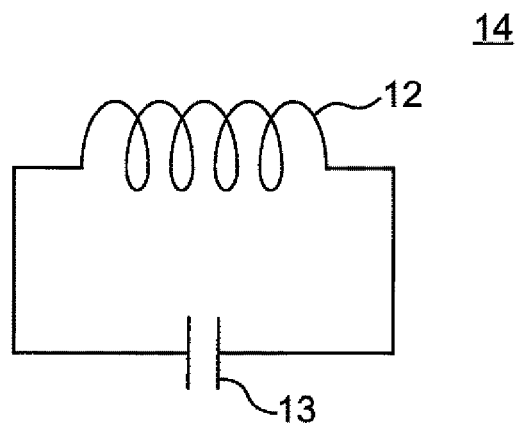
FIG. 3B is an equivalent circuit diagram of the resonant antenna of FIG. 3A.

FIG. 3A is a plan view of one resonant antenna 14 configuring the antenna portion 16 of the attachable booster antenna 20 of FIG. 1. FIG. 3B is an equivalent circuit diagram of the resonant antenna 14 of FIG. 3A.

As shown in FIGS. 3A and 3B, the one resonant antenna 14 comprises a loop antenna 12 and a capacitor 13 connected in series thereto. The size of the loop antenna 12 is roughly decided depending on the size of a loop antenna of the RFID tag to be detected. Therefore, the size of each loop antenna 12 may be substantially the same. The loop antenna 12 can be a loop antenna having inner and outer diameter dimensions substantially equal to those of the coil antenna 22. In this case, the resonant frequency of the resonant antenna 14 is decided by the capacitance of the capacitor 13. The size of the loop antenna 12 and the capacitance of the capacitor 13 may be set such that the resonant frequency falls in the range of a UHF band (860 MHz to 960 MHz) for example.

The resonant antennas at the center of the array of the antenna portion 16, e.g. the resonant antennas 14f and 14g may have a resonant frequency higher than that of the resonant antennas 14a, 14b, etc. at the edge of the array. This can provide an effect that actual resonant frequencies of the arrayed resonant antennas can match.

Description will be given of a problem corresponding to the above effect in the actual resonant frequencies of the arrayed resonant antennas. The problem is that even though the each resonant antenna is adjusted to have the same resonant frequency, if arrayed two-dimensionally or one-dimensionally in a plane, the actual resonant frequencies differ for each part. First, in the central resonant antennas 14f, 14g, etc., the stray capacitance with adjacent peripheral resonant antennas will increase. For that reason, the resonant antennas 14f, 14g, etc. at the center among the arrayed resonant antennas are considered to have a resonant frequency lower than the resonant frequency of the resonant antennas at the edge, as compared with the resonant frequency set solely. Thus, by previously setting the resonant frequency of the resonant antennas 14f, 14g, etc. at the center of the array higher than the resonant frequency of the resonant antennas 14a, 14b, etc. at the edge of the array, the resonant frequencies of the resonant antennas 14a to 14t of the entire array can match.

Examples of a method for setting the resonant frequency of the resonant antenna include a method changing the size of the loop antenna 12 or the capacitance of the capacitor. For example, the resonant frequency can may be set by changing the capacitance of the capacitor with the size of the resonant antennas being unchanged. Specifically, the capacitance of the capacitors of the resonant antennas at the center of the array may be set smaller than the capacitance of the capacitors of the resonant antennas at the edge thereof. A resonant antenna according to a second embodiment described later uses capacitance via insulator layers instead of using the capacitor. In this case, the insulator layer at the center of the array and the insulator layer at the edge thereof may be set different in the material and the thickness so that the capacitance at the center of the array differs from the capacitance at the edge thereof.

<Attachment Portion>

Figure 9:
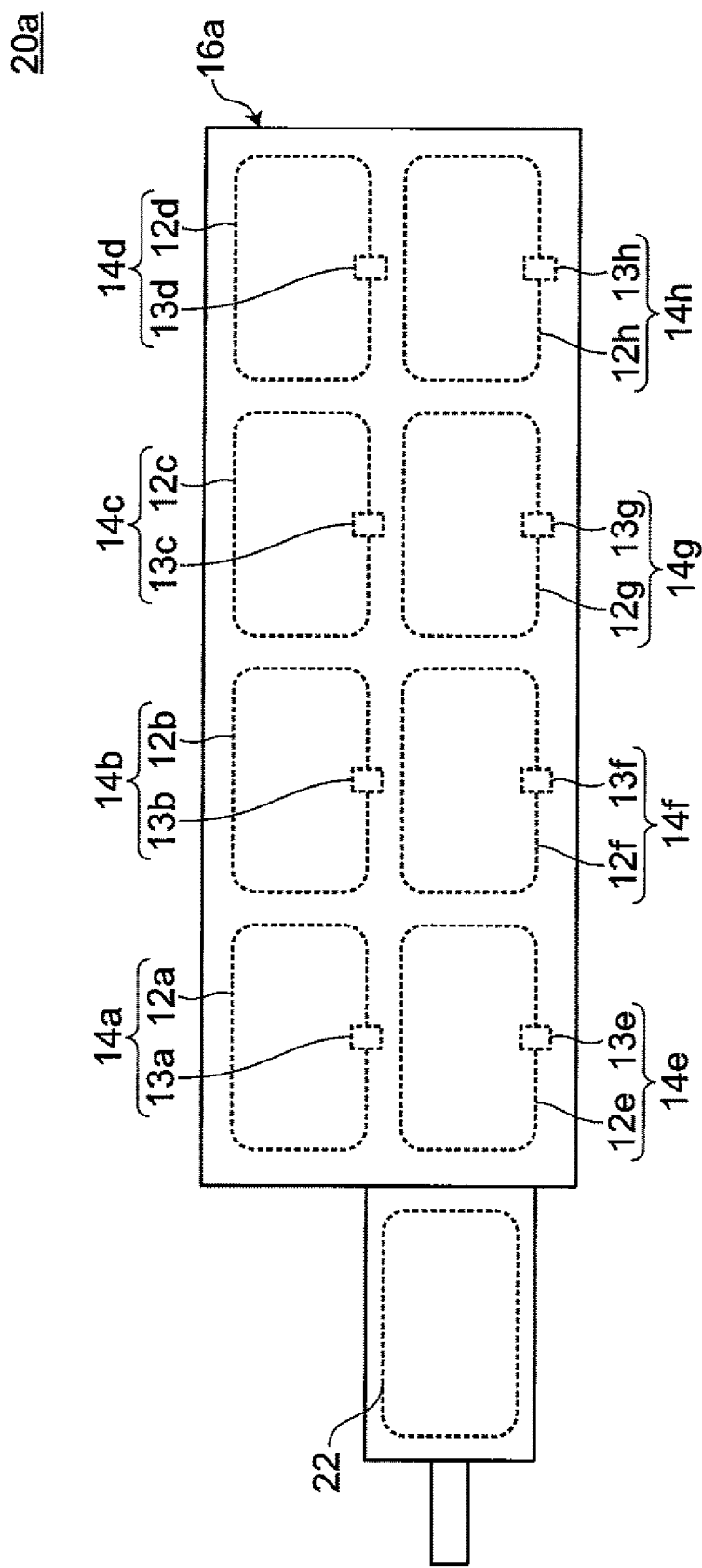
FIG. 9 is a plan view of an attachable booster antenna according to a third exemplary embodiment.

By the attachment portion 18, the coil antenna 22 is configured to be attached to the body portion 10. The attachment portion 18 can be for example the slot 24 shown in FIG. 1 or screwing 26a and 26b shown in FIGS. 5A and 5B. The attachment portion 18 is disposed at a position where the coil antenna 22 magnetically couples with the resonant antenna 14q that is one of the plurality of resonant antennas 14a to 14t. In this case, by aligning the center of the coil antenna 22 with the center of the resonant antenna 14l, the coil antenna 22 and the resonant antenna 14l can be magnetically coupled together. The method for magnetically coupling the coil antenna 22 and resonant antenna 14q is not limited to the case of superimposing the coil antenna 22 and the resonant antenna 14q as described above. For example, as shown in a third embodiment, by allowing the coil antenna 22 to adjoin one of the resonant antennas, the two may be magnetically coupled together (FIG. 9).

Figure 4:
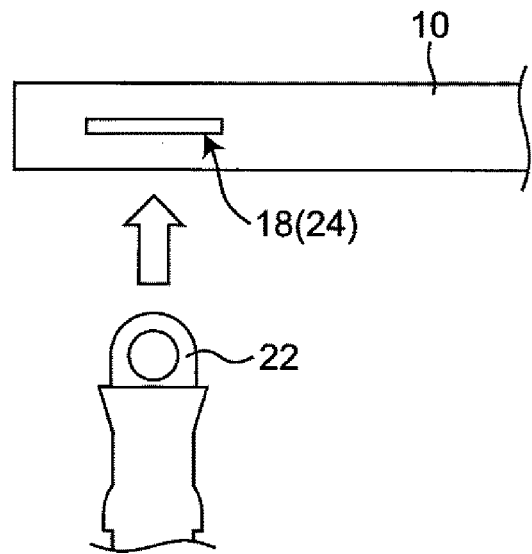
FIG. 4 is a schematic view showing the insertion of the coil antenna into the slot of the attachable booster antenna of FIG. 1.
Figure 5A:
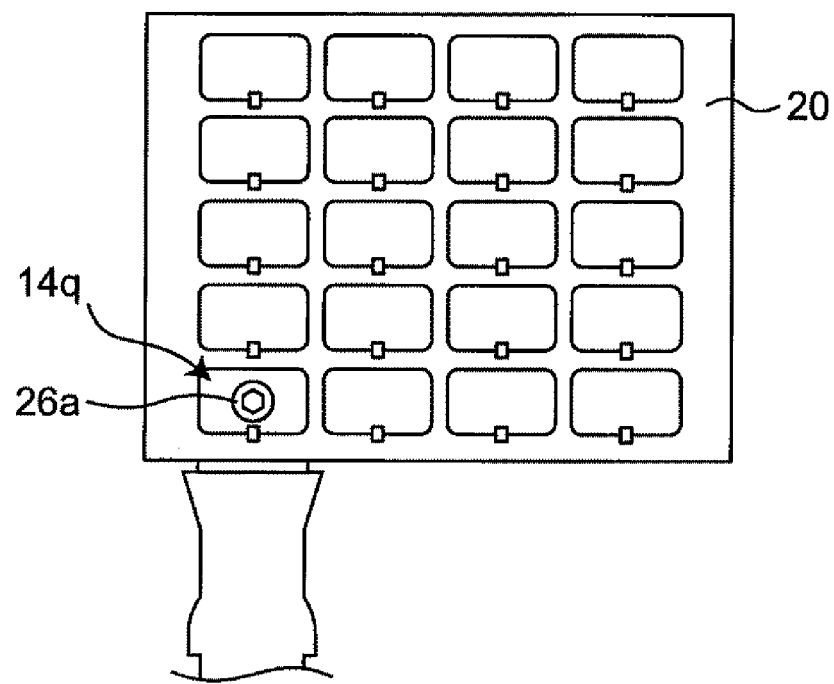
FIG. 5A is a plan view showing a status of the coil antenna screwed to the attachable booster antenna.
Figure 5B:
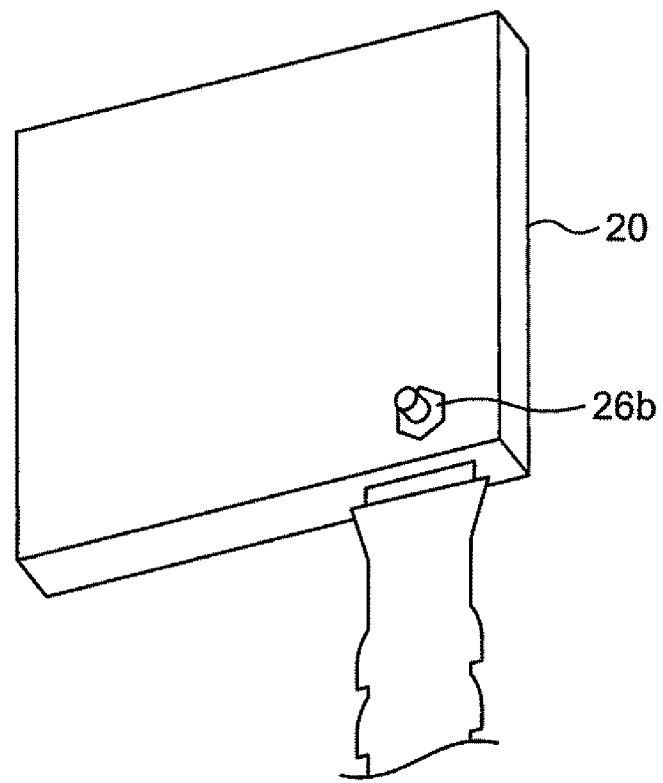
FIG. 5B is a bottom view of FIG. 5A.

FIG. 4 is a schematic view showing the insertion of the coil antenna 22 into the slot 24 of the attachable booster antenna 20 of FIG. 1. FIG. 5A is a plan view showing a status of the coil antenna 22 screwed to the attachable booster antenna 20. FIG. 5B is a bottom view of FIG. 5A.

When the slot 24 is provided as the attachment portion 18, as shown in FIG. 4, the coil antenna 22 is inserted into the slot 24 so that the coil antenna 22 can be attached to the body portion 10. Use of the slot 24 enables an XY position of the coil antenna 22 to easily be located. That is, use of the slot 24 having a predetermined size enables the center of the coil antenna 22 and the center of the resonant antenna 14q to easily coincide.

In the case of using the screws 26a and 26b as the attachment portion 18, as shown in FIGS. 5A and 5B, the coil antenna 22 and the resonant antenna 14m can be screwed to each other in a superimposed manner. In this case, preferably the coil antenna 22 and the resonant antenna 14q are screwed together such that their respective centers coincide.

The slot 24 and the screwing can be used together. The attachable booster antenna 20 and the coil antenna 22 may be adhered to each other.

The screws used are desirably formed from a material such as resin having a less influence on a magnetic field generated by the coil antenna 22.

The size of the coil antenna 22 is for example 0.5 to 1.5 times the size of the resonant antenna 14q in both the inner and outer diameter dimensions.

Figure 6A:
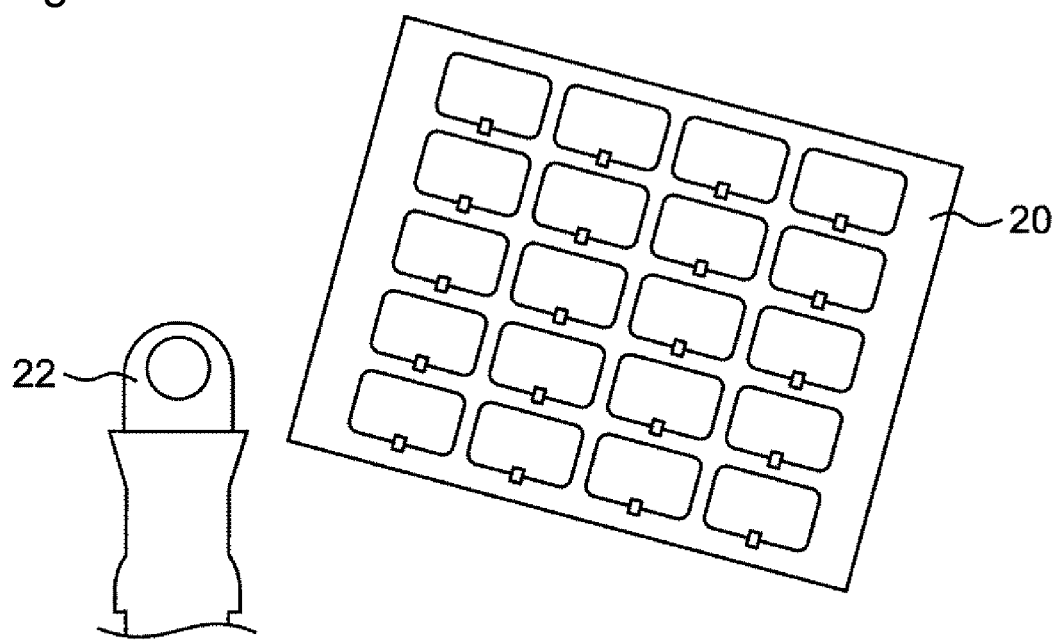
FIG. 6A is a schematic view showing the attachable booster antenna and the coil antenna.
Figure 6B:
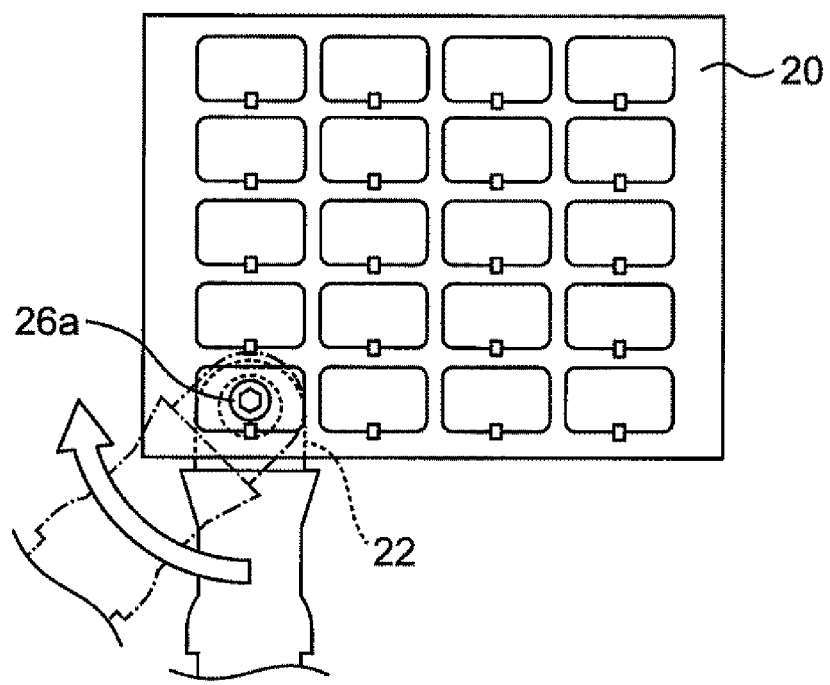
FIG. 6B is a schematic view showing a status of the coil antenna rotatably screwed to the attachable booster antenna.

FIG. 6A is a schematic view showing the attachable booster antenna 20 and the coil antenna 22. FIG. 6B is a schematic view showing a status of the coil antenna 22 rotatably screwed to the attachable booster antenna 20.

As shown in FIG. 6B, the coil antenna 22 is rotatably screwed to a corner of the antenna portion 16 of the attachable booster antenna 20 so that the attachable booster antenna 20 can be rotated with respect to the coil antenna 22. This enables a request to change the measurement direction depending on the type of the RFID tag to be dealt with.

<Read of RFID Tag>

Figure 7:
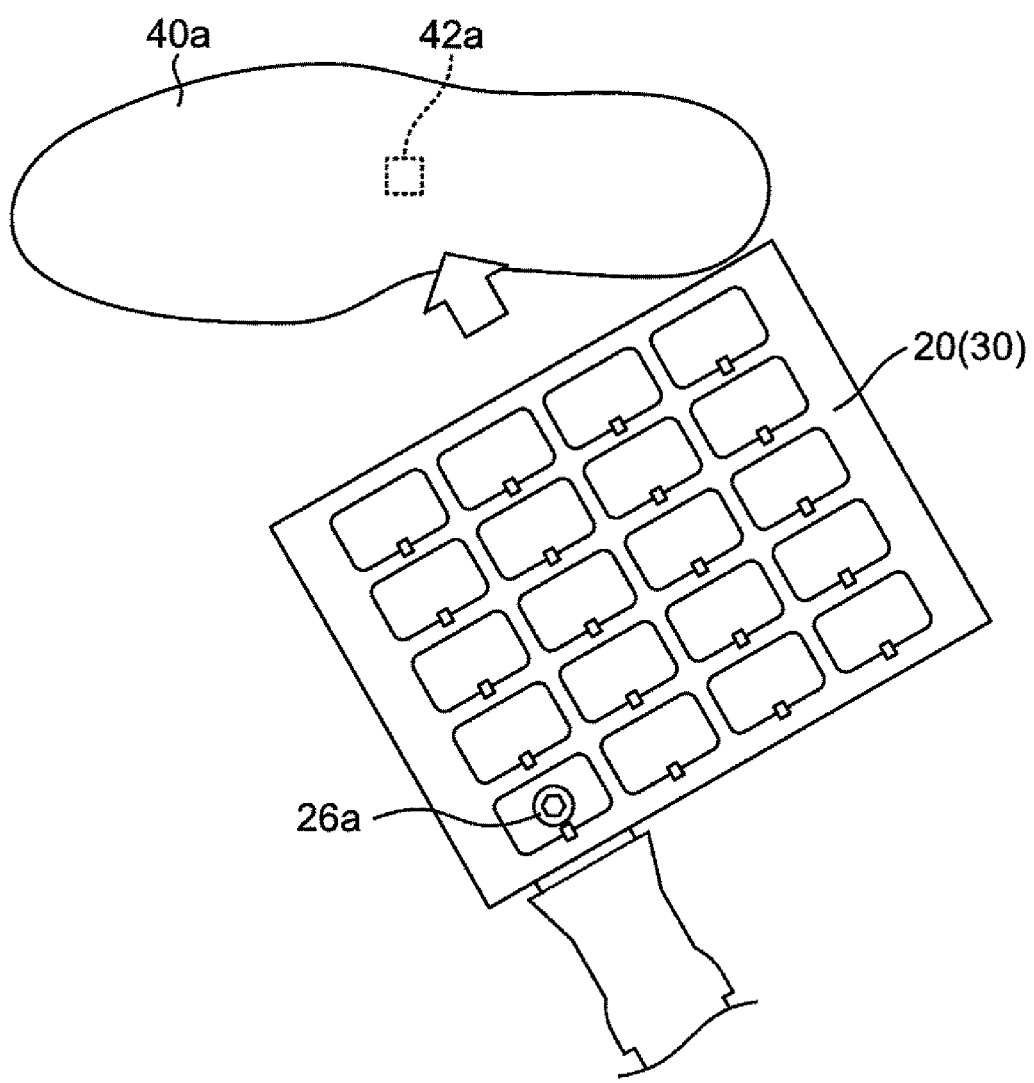
FIG. 7 is a schematic view showing a state of the attachable booster antenna abutted against an RFID tag on a flat bottom of a shoe.

FIG. 7 is a schematic view showing a state of the attachable booster antenna 20 abutted against an RFID tag 42a on a flat bottom 40a of a shoe.

As shown in FIG. 7, in order to read the RFID tag 42a embedded in the flat bottom 40a of the shoe, this attachable booster antenna 20 may be abutted against a rough area on the flat bottom 40a of the shoe. In this case, due to the expansion of the detectable range as compared with the coil antenna 22, read can be done irrespective of a slight displacement of a point to embed the RFID tag 42a.

Second Embodiment

Figure 8A:
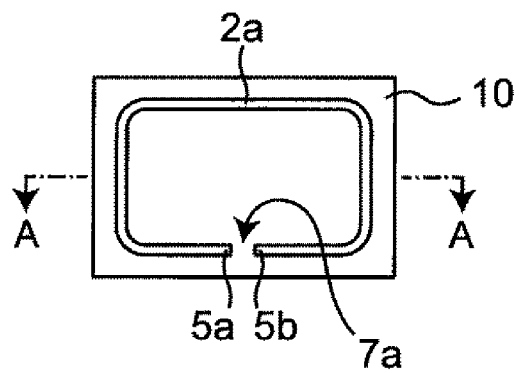
FIG. 8A is a plan view of one resonant antenna making up an antenna portion of an attachable booster antenna according to a second exemplary embodiment.
Figure 8B:
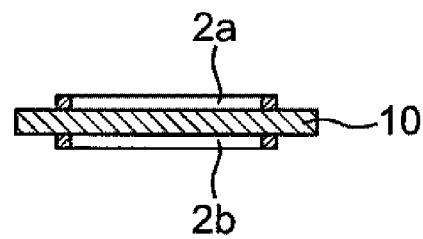
FIG. 8B is a sectional view from A-A direction of the resonant antenna of FIG. 8A.
Figure 8C:
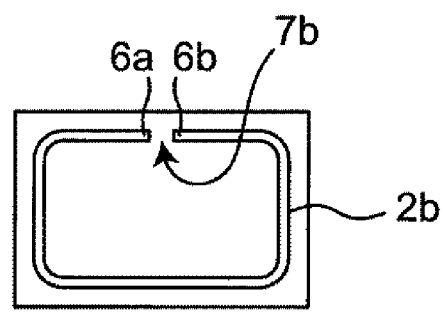
FIG. 8C is a bottom view of the resonant antenna of FIG. 8A.
Figure 8D:
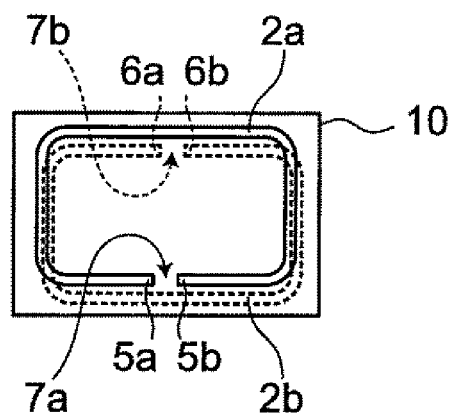
FIG. 8D is a transparent view of the resonant antenna of FIG. 8A.
Figure 8E:
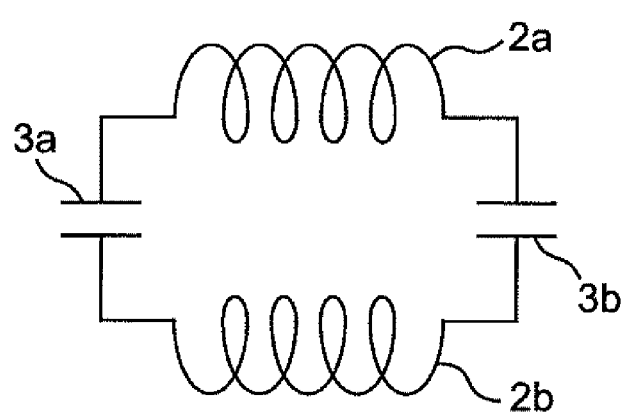
FIG. 8E is an equivalent circuit diagram of a resonant circuit of FIG. 8A.

FIG. 8A is a plan view of one resonant antenna 4 making up an antenna portion of an attachable booster antenna according to the second exemplary embodiment. FIG. 8B is a sectional view from A-A direction of the resonant antenna 4 of FIG. 8A. FIG. 8C is a bottom view of the resonant antenna 4 of FIG. 8A. FIG. 8D is a transparent view of the resonant antenna 4 of FIG. 8A. FIG. 8E is an equivalent circuit diagram of a resonant circuit of FIG. 8A. Although in FIG. 8D a first loop antenna 2a on the upper surface side and a second loop antenna 2b on the lower surface side are shown offset for ease of understanding, it is desirable actually that the first loop antenna 2a on the upper surface side and the second loop antenna 2b on the lower surface side be laid substantially overlapping each other in a transparent plane. The attachable booster antenna according to the second embodiment differs from the attachable booster antenna according to the first embodiment in the absence of a capacitor connected in series to the resonant antenna 4. Due to the absence of series-connected capacitor in this manner, the thickness of the antenna portion can be reduced. Since the capacitor is not mounted, an excellent durability is ensured. Since the capacitor is not mounted, the capacitor mounting cost is not required.

This resonant antenna 4 comprises an insulator layer 10 having a first surface and a second surface, and the first loop antenna 2a and the second loop antenna 2b confronting each other via the insulator layer 10 that are arranged on the first surface (upper surface) and the second surface (lower surface), respectively. The first loop antenna 2a and the second loop antenna 2b have their respective openings 7a and 7b that discontinue a part of the respective loops. The first loop antenna 2a and the second loop antenna 2b are arranged such that a closed loop is defined by at least a part of the first loop antenna 2a and at least a part of the second loop antenna 2b in a transparent plane viewed from the normal direction of the insulator layer 10. Furthermore, capacitances 3a and 3b via the insulator layer 10 are formed between ends 5a and 5b defining the opening 7a of the first loop antenna 2a and a corresponding part of the second loop antenna. The capacitances 3a and 3b via the insulator layer 10 are formed between ends 6a and 6b defining the opening 7b of the second loop antenna 2b and a corresponding part of the first loop antenna. Although the body portion is used herein as the insulator layer 10, the antenna portion may be formed separate from the body portion. As shown in FIGS. 8A and 8C, the opening 7a of the first loop antenna 2a do not correspond to the opening 7b of the second loop antenna 2b, this is not limitative. For example, the ends 5a and 5b may be disposed on each of opposite sides, with the ends 6a and 6b being disposed at positions coincident with the ends 5a and 5b, such that the ends 5a and 5b of the first loop antenna 2a and the ends 6a and 6b of the second loop antenna 2b define overlapping parts via the insulator layer 10.

Third Embodiment

FIG. 9 is a plan view of an attachable booster antenna 20a according to the third exemplary embodiment. FIG. 10 is a schematic view showing a state of the resonant antennas 14a to 14h of the attachable booster antenna 20a of FIG. 9 magnetically coupled together.

The attachable booster antenna 20a according to the third embodiment differs from the attachable booster antenna according to the first embodiment in that the attachment portion is disposed at a lateral part of the resonant antenna 14e so that the coil antenna 22 magnetically couples with the resonant antenna 14e adjacent thereto. This allows various cases of magnetic coupling between the coil antenna 22 and the resonant antenna to be prepared.

As shown in FIG. 10, in this attachable booster antenna 20a, magnetic field coupling 28 between the coil antenna 22 and the adjacent resonant antenna 14e is transmitted like a daisy chain to the resonant antennas 14a to 14h of an antenna portion 16a, to consequently expand the detectable range to the entire antenna portion 16a.

When the RFID tag is for example a ultra-small tag incorporating a coil antenna of 2.0 mm×1.5 mm in size, it cannot be read by a large-sized coil antenna and hence such a small-sized loop antenna is suitable for reading.

Fourth Embodiment

Figure 11A:
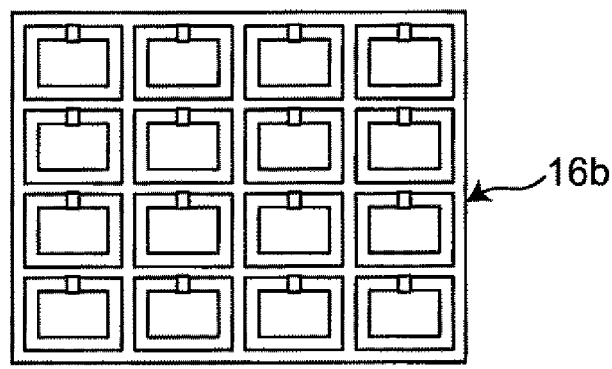
FIG. 11A is a plan view of an antenna portion as a base unit of an attachable booster antenna according to a fourth exemplary embodiment.
Figure 11B:
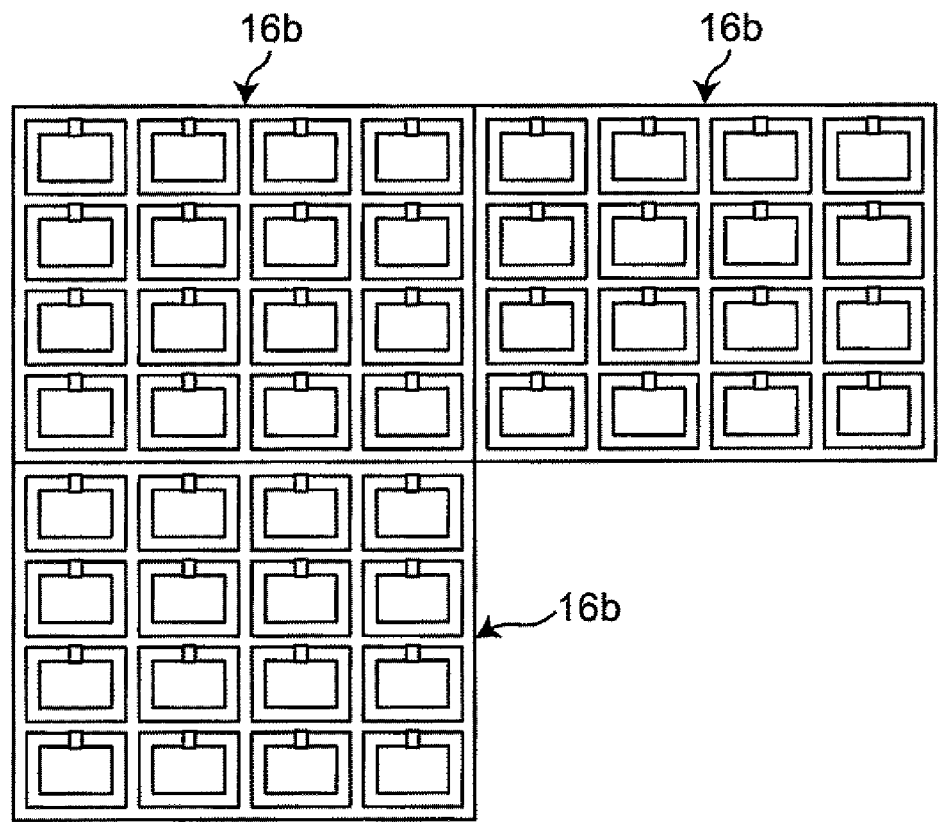
FIG. 11B is a plan view of an attachable booster antenna according to the fourth embodiment using a plurality of antenna portions as base units of FIG. 11A.

FIG. 11A is a plan view of an antenna portion 16b as a base unit of an attachable booster antenna 20b according to a fourth exemplary embodiment. FIG. 11B is a plan view of an attachable booster antenna 20c according to the fourth embodiment using a plurality of antenna portions 16b as base units of FIG. 11A.

The attachable booster antenna according to the fourth embodiment differs from the attachable booster antenna according to the first embodiment in that one or more antenna portions 16b as the base units are arranged. In this manner, by arranging one or more antenna portions 16b as the base units, the detectable range can easily be expanded.

Although in FIG. 11B three antenna portions 16b as the base units are arranged, the number of the antenna portions 16b as the base units to be arranged is not limited thereto and any number of antenna portions as the base units may be arranged.

Fifth Embodiment

FIG. 12 is a plan view of an attachable booster antenna 20d according to a fifth exemplary embodiment.

The attachable booster antenna 20d according to the fifth embodiment differs from the attachable booster antenna according to the first embodiment in that resonant antennas 14a to 14i are arranged in zigzag instead of matrix. Specifically, for the resonant antennas 14a to 14i, among a first row 32, a second row 33, and a third row 34 extending in an x-direction and adjacent in a y-direction, the resonant antennas in the second row 33 are arranged offset in the x-direction.

An antenna portion 16c of this attachable booster antenna 20d comprises the first row 32 in which the resonant antennas 14a to 14c are arrayed along a first direction (x-direction) and the second row 33 in which the resonant antennas 14d to 14f are arrayed offset along the first direction from the disposition position of the first row 32, the second row 33 being adjacent to the first row 32 in a second direction (y-direction) intersecting the first direction (x-direction).

In this manner, by arranging the resonant antennas in the second row 33 offset in the x-direction from the first row 32, null points occurring at gaps between the resonant antennas in the first row 32 in the x-direction can be covered by the resonant antennas in the second row 33. That is, in the case of the matrix arrangement, the null points easy to occur between gaps the resonant antennas are arrayed in a line on the same x-axis, and therefore the detection may become difficult at that specific x-coordinate. As described above, by the offset arrangement in the x-direction of the resonant antennas in the second row 33 from the first row 32, the x-coordinates of the null points in the first row 32 can be offset from the x-coordinates of the null points in the second rows 33. This results in a solution of the problem that reading is difficult at specific x-coordinates.

Fifth Embodiment

FIG. 13 is a schematic view showing a state of an attachable booster antenna 20e according to a sixth exemplary embodiment, abutted against an RFID tag 42b disposed on a sole of a high-heeled shoe 40b.

The attachable booster antenna 20e according to the sixth embodiment differs from the attachable booster antenna according to the first embodiment in that the former is curved rather than planar. This enables the attachable booster antenna 20e to be abutted closely against a curved part like the sole of the high-heeled shoe 40b.

In an exemplary aspect, the body portion configuring this attachable booster antenna 20e may be formed from rubber, PET film, etc.

It is also noted that this attachable booster antenna 20e is not limited to the curved shape and may be deformable into a shape conforming to the shape of an object article.

It is to be understood that this disclosure encompasses proper combinations of any embodiments and/or examples among the above various embodiments and/or examples, which can present effects provided by each embodiment and/or example.

According to the attachable booster antenna and the reader/writer using the same of the present invention, the small-sized loop antenna of the RFID tag can be read without providing a plurality of reader/writers.

EXPLANATIONS OF LETTERS OR NUMERALS 2a, 2b loop antenna including a discontinuity
3a, 3b capacitance
4 resonant antenna
5a, 5b end
6a, 6b end
7a, 7b opening
10 body portion
12, 12a, 12b, 12c, 13d, 12e, 13f, 12g, 12h, 12i, 12j, 12k, 13l, 12m, 12n, 12o, 12p, 13q, 12r, 12s, 12t loop antenna
13, 13a, 13b, 13c, 13d, 13e, 13f, 13g, 13h, 13i, 13j, 13k, 13l, 13m, 13n, 13o, 13p, 13q, 13r, 13s, 13t capacitance (capacitor)
14, 14a, 14b, 14c, 14d, 14e, 14f, 14g, 14h, 14i, 14j, 14k, 14l, 14m, 14n, 14o, 14p, 14q, 14r, 14s, 14t resonant antenna
16, 16a antenna portion
18 attachment portion
20, 20a, 20b, 20c, 20d attachable booster antenna
22 coil antenna
24 slot
26a, 26b screw
28 magnetic field coupling
30 reader/writer
32 first row
33 second row
34 third row
40a shoe flat bottom
40b high-heeled shoe
42a, 42b RFID tag

The invention claimed is:

1. An attachable booster antenna configured to attach to a coil antenna, the attachable booster comprising:
    a body; and
    an antenna including a plurality of resonant antennas disposed on the body, with each resonant antenna including:
        an insulator layer having a first surface and a second surface that opposes the first surface in a thickness direction of the insulator; and
        a first loop antenna disposed on the first surface of the insulator and a second loop antenna disposed on the second surface of the insulator to oppose the first loop antenna;
    wherein the first and second loop antennas are each configured as a loop with an opening that discontinues a portion of the loop,
    wherein the first and the second loop antennas are disposed to collectively form a closed loop in a transparent plane viewed from a normal direction of either of the first and second surfaces of the insulator layer,
    wherein an opening area in the loops of at least one of the first and second loop antennas overlaps an area in a loop of the coil antenna in a plan view of the insulator layer when the attachable booster is attached to the coil antenna,
    wherein the first and second loop antennas overlap each other in the thickness direction of the insulator, and
    wherein the first and second loop antennas resonate at a communication frequency for the coil antenna.

2. The attachable booster antenna according to claim 1, wherein the antenna is configured to set a resonant frequency of at least one resonant antenna at a center of an array of the plurality of resonant antennas higher than a resonant frequency of at least one resonant antenna at a respective end of the array of the plurality of resonant antennas.

3. The attachable booster antenna according to claim 1, wherein the plurality of resonant antennas are each connected in series to at least one of the first and second loop antennas of the respective resonant antenna.

4. The attachable booster antenna according to claim 1, wherein the plurality of resonant antennas in the antenna are two-dimensionally disposed on the body.

5. The attachable booster antenna according to claim 1, wherein the first and second loop antennas of each of the plurality of resonant antennas includes inner and outer diameter dimensions that are substantially equal to respective dimensions of the coil antenna.

6. The attachable booster antenna according to claim 1, wherein the antenna includes:

a first row having a plurality of the resonant antennas disposed along the first direction; and a second row having a plurality of the resonant antennas disposed along the first direction.

7. The attachable booster antenna according to claim 6, wherein the resonant antennas in the second row are disposed offset from the resonant antennas in the first row.

8. The attachable booster antenna according to claim 1, further comprising a slot configured for the coil antenna to be inserted therein.

9. The attachable booster antenna according to claim 1, wherein the body comprises a curved surface shape.

10. The attachable booster antenna according to claim 1, wherein the body comprises a card type.

11. A reader/writer comprising:
a coil antenna; and
an attachable booster antenna configured to attach to the coil antenna, and comprising:
a body; and
an antenna having a plurality of resonant antennas disposed on the body, with each resonant antenna including:
an insulator layer having a first surface and a second surface that opposes the first surface in a thickness direction of the insulator; and
a first loop antenna disposed on the first surface of the insulator and second loop antenna disposed on the second surface of the insulator to oppose the first loop antenna;
wherein the first and second loop antennas are each configured as a loop with an opening that discontinues a portion of the respective loop,
wherein the first and the second loop antennas are disposed to collectively form a closed loop in a transparent plane viewed from a normal direction of either of the first and second surfaces of the insulator layer,
wherein an opening area in the loops of at least one of the first and second loop antennas overlaps an area in a loop of the coil antenna in a plan view of the insulator layer when the attachable booster is attached to the coil antenna,
wherein the first and second loop antennas overlap each other in the thickness direction of the insulator, and
wherein the first and second loop antennas resonate at a communication frequency for the coil antenna.

12. The reader/writer according to claim 11, wherein the attachable booster antenna comprises a slot configured for the coil antenna to be inserted therein.

13. An attachable booster antenna configured to attach to a coil antenna, the attachable booster comprising:
a body; and
an antenna including a plurality of resonant antennas disposed on the body, with each resonant antenna including:
an insulator layer having a first surface and a second surface that opposes the first surface in a thickness direction of the insulator; and
a first loop antenna disposed on the first surface of the insulator and a second loop antenna disposed on the second surface of the insulator to oppose the first loop antenna;
wherein the first and second loop antennas are each configured as a loop with an opening that discontinues a portion of the loop,
wherein the first and the second loop antennas are disposed to collectively form a closed loop in a transparent plane viewed from a normal direction of either of the first and second surfaces of the insulator layer,
wherein an opening area in the loops of at least one of the first and second loop antennas overlaps an area in a loop of the coil antenna in a plan view of the insulator layer when the attachable booster is attached to the coil antenna,
wherein the first and the second loop antennas are each a single loop antenna, and
wherein the first and second loop antennas resonate at a communication frequency for the coil antenna.

14. The attachable booster antenna according to claim 13, wherein a first end of the first loop antenna and a first end of the second loop antenna overlap each other in the thickness direction of the insulator layer, and a second end of the first loop antenna and a second end of the second loop antenna overlap each other, such that the respective first and second ends of the first and second loop antennas collectively form the closed loop when viewed from the normal direction of either of the first and second surfaces of the insulator layer.

15. The attachable booster antenna according to claim 13, wherein the antenna is configured to set a resonant frequency of at least one resonant antenna at a center of an array of the plurality of resonant antennas higher than a resonant frequency of at least one resonant antenna at a respective end of the array of the plurality of resonant antennas.

16. The attachable booster antenna according to claim 13, wherein the plurality of resonant antennas are each connected in series to at least one of the first and second loop antennas of the respective resonant antenna.

17. The attachable booster antenna according to claim 13, wherein the plurality of resonant antennas in the antenna are two-dimensionally disposed on the body.

18. The attachable booster antenna according to claim 13, wherein the first and second loop antennas of each of the plurality of resonant antennas includes inner and outer diameter dimensions that are substantially equal to respective dimensions of the coil antenna.

19. The attachable booster antenna according to claim 13, wherein the antenna includes:
a first row having a plurality of the resonant antennas disposed along the first direction; and
a second row having a plurality of the resonant antennas disposed along the first direction.

20. The attachable booster antenna according to claim 19, wherein the resonant antennas in the second row are disposed offset from the resonant antennas in the first row.

21. The attachable booster antenna according to claim 13, further comprising a slot configured for the coil antenna to be inserted therein.

22. The attachable booster antenna according to claim 13, wherein the body comprises a curved surface shape.

23. The attachable booster antenna according to claim 13, wherein the body comprises a card type.

* * * * *